US009946366B2

(12) United States Patent
Shahparnia et al.

(10) Patent No.: US 9,946,366 B2
(45) Date of Patent: Apr. 17, 2018

(54) DISPLAY, TOUCH, AND STYLUS SYNCHRONIZATION

(71) Applicant: Apple Inc., Cupertino, CA (US)

(72) Inventors: Shahrooz Shahparnia, Campbell, CA (US); Christopher Tenzin Mullens, San Francisco, CA (US); Martin Paul Grunthaner, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 465 days.

(21) Appl. No.: 13/908,936

(22) Filed: Jun. 3, 2013

(65) Prior Publication Data

US 2014/0354555 A1 Dec. 4, 2014

(51) Int. Cl.
*G06F 3/0354* (2013.01)
*G06F 3/041* (2006.01)
*G06F 3/044* (2006.01)

(52) U.S. Cl.
CPC .......... *G06F 3/03545* (2013.01); *G06F 3/044* (2013.01); *G06F 3/0416* (2013.01)

(58) Field of Classification Search
None
See application file for complete search history.

(56) References Cited

U.S. PATENT DOCUMENTS

| 5,483,261 A | 1/1996 | Yasutake |
| 5,488,204 A | 1/1996 | Mead et al. |
| 5,543,590 A | 8/1996 | Gillespie et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |

(Continued)

FOREIGN PATENT DOCUMENTS

| EP | 2 264 576 A1 | 12/2010 |
| EP | 2264568 | * 12/2010 |

(Continued)

OTHER PUBLICATIONS

International Search Report dated Jun. 27, 2014, for PCT Application No. PCT/US2014/019822, filed Mar. 3, 2014, three pages.

(Continued)

*Primary Examiner* — Jennifer Mehmood
*Assistant Examiner* — Parul Gupta
(74) *Attorney, Agent, or Firm* — Morrison & Foerster LLP

(57) ABSTRACT

A touch input device configured to synchronize a stylus acquisition process with both a touch data acquisition process and a display refresh process is provided. The touch input device can include one or more processors that can synchronize the stylus data acquisition process to the touch data acquisition process by coordinating stylus scans to take place in between touch scans. The one or more processors can also virtual data banks to synchronize both the touch data acquisition and the stylus scan acquisition with the display refresh process.

25 Claims, 16 Drawing Sheets

(56) References Cited

U.S. PATENT DOCUMENTS

| | | | |
|---|---|---|---|
| 8,479,122 | B2 | 7/2013 | Hotelling et al. |
| 8,816,988 | B2 | 8/2014 | Chan et al. |
| 2004/0095333 | A1 | 5/2004 | Morag et al. |
| 2006/0026521 | A1 | 2/2006 | Hotelling et al. |
| 2006/0197753 | A1 | 9/2006 | Hotelling |
| 2008/0062148 | A1* | 3/2008 | Hotelling ............ G02F 1/13338 345/174 |
| 2008/0243994 | A1* | 10/2008 | Kropivny ................ H04L 67/38 709/203 |
| 2010/0108410 | A1* | 5/2010 | Yeh ............................ 178/18.07 |
| 2010/0155153 | A1* | 6/2010 | Zachut ....................... 178/18.03 |
| 2010/0321315 | A1 | 12/2010 | Oda et al. |
| 2011/0205244 | A1* | 8/2011 | Myers ................... G06F 3/0386 345/634 |
| 2012/0013555 | A1 | 1/2012 | Maeda et al. |
| 2012/0212441 | A1 | 8/2012 | Christiansson et al. |
| 2013/0050101 | A1* | 2/2013 | Lu ................................ 345/173 |
| 2013/0050116 | A1 | 2/2013 | Shin et al. |
| 2013/0069894 | A1 | 3/2013 | Chen et al. |
| 2013/0093722 | A1 | 4/2013 | Noguchi et al. |
| 2014/0028577 | A1* | 1/2014 | Krah .................... G06F 3/0416 345/173 |
| 2014/0071082 | A1 | 3/2014 | Singh et al. |
| 2014/0267070 | A1 | 9/2014 | Shahparnia et al. |
| 2014/0267071 | A1 | 9/2014 | Shahparnia |

FOREIGN PATENT DOCUMENTS

| | | | |
|---|---|---|---|
| EP | 2264576 | * | 12/2010 |
| EP | 2264576 A1 | * | 12/2010 |
| EP | 2 343 631 A1 | | 7/2011 |
| JP | 2000-163031 A | | 6/2000 |
| JP | 2002-342033 A | | 11/2002 |
| TW | 201229835 A | | 7/2012 |
| TW | 201310304 A | | 3/2013 |
| WO | WO-2014/158748 A1 | | 10/2014 |
| WO | WO-2014/197163 A1 | | 12/2014 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action dated Jan. 26, 2015, for U.S. Appl. No. 13/830,127, filed Mar. 14, 2013, 11 pages.

International Search Report dated Nov. 12, 2014, for PCT Application No. PCT/US2014/037376, filed May 8, 2014, seven pages.

Final Office Action dated Jul. 31, 2015, for U.S. Appl. No. 13/830,127, filed Mar. 14, 2013, 13 pages.

Search Report dated May 26, 2015 for ROC (Taiwan) Patent Application No. 103118140, filed May 23, 2014, with English translation, two pages.

Non-Final Office Action dated Apr. 2, 2015, for U.S. Appl. No. 13/830,399, filed Mar. 14, 2013, eight pages.

Final Office Action dated Oct. 7, 2015, for U.S. Appl. No. 13/830,399, filed Mar. 14, 2013, twelve pages.

\* cited by examiner

DISPLAY, TOUCH, AND STYLUS SYNCHRONIZATION

FIELD

This relates generally to touch sensitive devices and, more specifically, to touch sensitive devices which can also accept input from a stylus.

BACKGROUND

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

As touch sensing technology continues to improve, touch sensitive devices are increasingly being used to compose and mark-up electronic documents. In particular, styli have become popular input devices as they emulate the feel of traditional writing instruments. Most conventional styli simply include a bulky tip made of a material capable of interacting with the touch sensitive device in a manner resembling a user's finger. As a result, conventional styli lack the precision and control of traditional writing instruments. A stylus capable of receiving stimulation and force signals and generating stylus stimulation signals that can be transmitted to the touch sensitive device can improve the precision and control of the stylus. However, in order to have stylus inputs appear smoothly on a display and integrate seamlessly with the touch and display functionality of the touch sensitive device, the stylus can be synchronized with the display and touch controllers on the device.

SUMMARY

A stylus signal detection and demodulation architecture that can allow for the stylus, display, and touch to be synchronized with one another is provided.

In one example, during acquisition of a touch image, acquisition of a bank of touch data can be delayed in order to accommodate a scheduled and periodic stylus signal acquisition, thus synchronizing the touch and stylus functions. The touch image and the stylus image can be reported by their respective controllers to the device when a synchronization pulse is provided by the display, thus synchronizing the touch and stylus acquisition to the display refresh process.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to the synchronization of stylus signals with touch data acquisition and display refresh in a device. In one example, the touch controller can synchronize the touch acquisition process to the stylus acquisition process, and then create a virtual mapping of touch inputs in order to synchronize the touch and stylus acquisition processes with the display refresh process.

Figure 1:
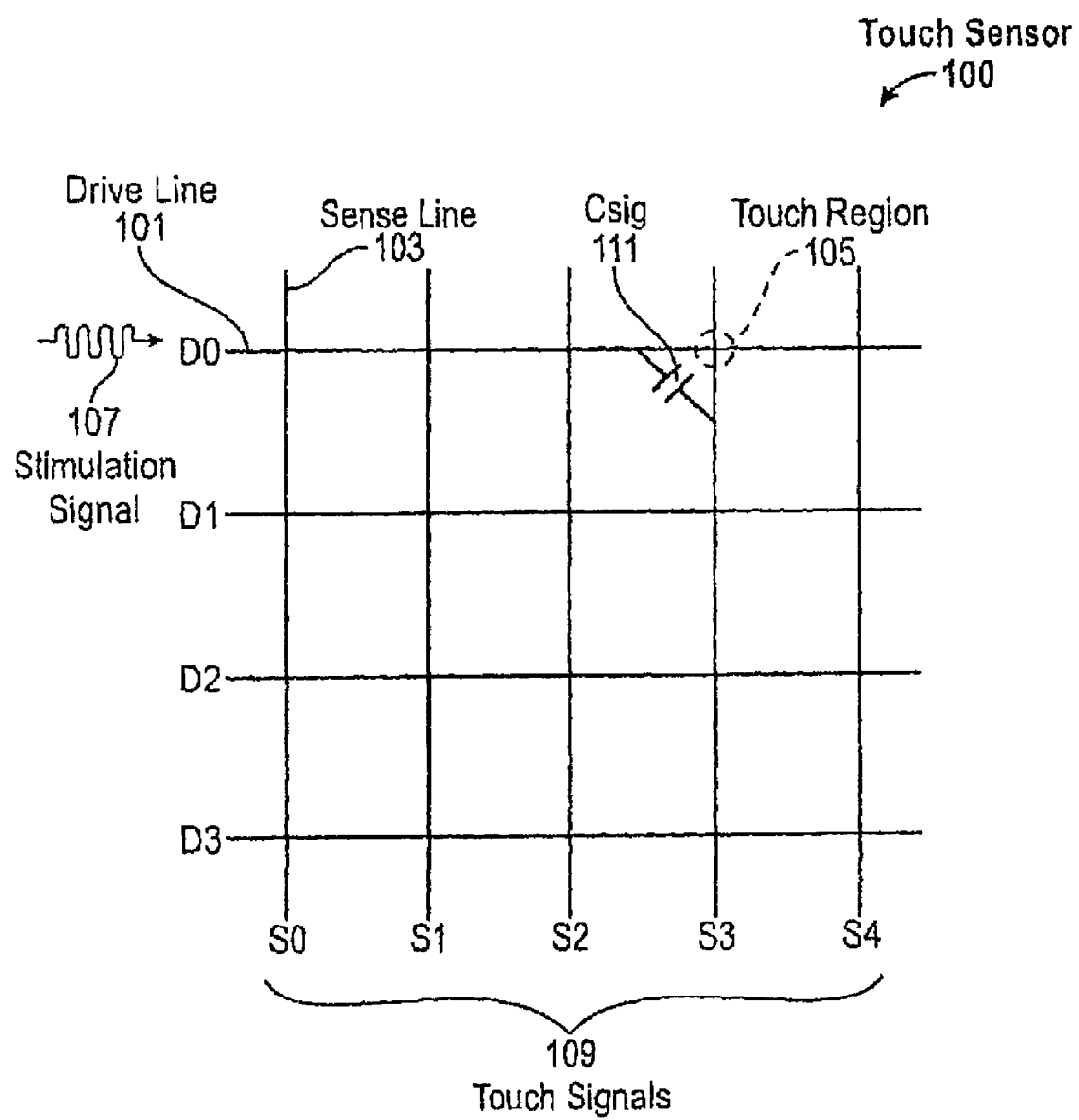
FIG. 1 illustrates an exemplary touch sensor that can be used with a touch sensitive device according to various examples.

FIG. 1 illustrates touch sensor 100 that can be used to detect touch events on a touch sensitive device, such as a mobile phone, tablet, touchpad, portable or desktop computer, portable media player, or the like. Touch sensor 100 can include an array of touch regions or nodes 105 that can be formed at the crossing points between rows of drive lines 101 (D0-D3) and columns of sense lines 103 (S0-S4), although it should be understood that the row/drive line and column/sense line associations are only exemplary. Each touch region 105 can have an associated mutual capacitance Csig 111 formed between the crossing drive lines 101 and sense lines 103 when the drive lines are stimulated. The drive lines 101 can be stimulated by stimulation signals 107 provided by drive circuitry (not shown) and can include an alternating current (AC) waveform. The sense lines 103 can receive touch signals 109 indicative of a touch at the touch sensor 100 to sense circuitry (not shown), which can include a sense amplifier for each sense line, or a fewer number of sense amplifiers that can be multiplexed to connect to a larger number of sense lines.

To sense a touch at the touch sensor 100, drive lines 101 can be stimulated by the stimulation signals 107 to capacitively couple with the crossing sense lines 103, thereby forming a capacitive path for coupling charge from the drive lines 101 to the sense lines 103. The crossing sense lines 103 can output touch signals 109, representing the coupled charge or current. When an object, such as a passive stylus, finger, etc., touches the touch sensor 100, the object can cause the capacitance Csig 111 to reduce by an amount ΔCsig at the touch location. This capacitance change ΔCsig can be caused by charge or current from the stimulated drive line 101 being shunted through the touching object to ground rather than being coupled to the crossing sense line 103 at the touch location. The touch signals 109 representative of the capacitance change ΔCsig can be received by the sense lines 103 to the sense circuitry for processing. The touch signals 109 can indicate the touch region where the touch occurred and the amount of touch that occurred at that touch region location.

While the example shown in FIG. 1 includes four drive lines 101 and five sense lines 103, it should be appreciated that touch sensor 100 can include any number of drive lines 101 and any number of sense lines 103 to form the desired number and pattern of touch regions 105. Additionally, while the drive lines 101 and sense lines 103 are shown in FIG. 1 in a crossing configuration, it should be appreciated that other configurations are also possible to form the desired touch region pattern. While FIG. 1 illustrates mutual capacitance touch sensing, other touch sensing technologies may also be used in conjunction with examples of the disclosure, such as self-capacitance touch sensing, resistive touch sensing, projection scan touch sensing, and the like. Furthermore, while various examples describe a sensed touch, it should be appreciated that the touch sensor 100 can also sense a hovering object and generate hover signals therefrom.

Figure 2:
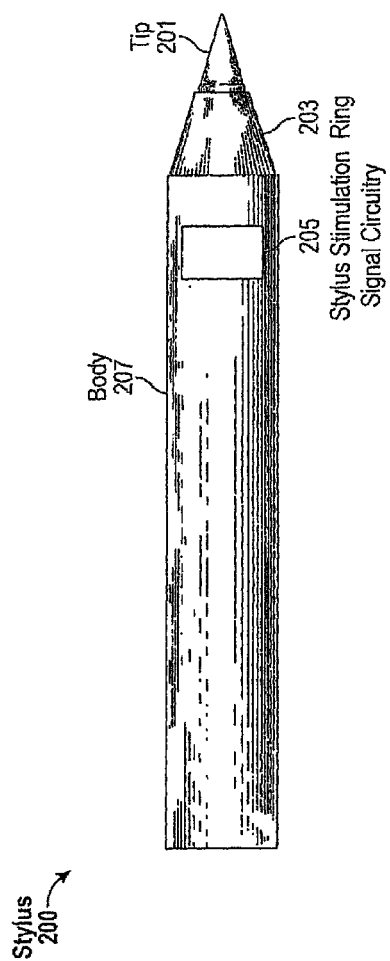
FIG. 2 illustrates a block diagram of an exemplary stylus according to various examples.

FIG. 2 illustrates a block diagram of an exemplary stylus 200 that can be used with a touch sensitive device, such as a mobile phone, touchpad, portable or desktop computer, or the like. Stylus 200 can generally include tip 201, ring 203, body 207, and multiple stylus stimulation signal circuitry 205 located within body 207. As will be described in greater detail below, stylus stimulation signal circuitry 205 can be used to generate a stimulation signal that can be transmitted to a touch sensitive device through tip 201. Tip 201 can include a material capable of transmitting the stylus stimulation signal from stylus stimulation signal circuitry 205 to the touch sensitive device, such as a flexible conductor, a metal, a conductor wrapped by a non-conductor, a non-conductor coated with a metal, a transparent conducting material (e.g., indium tin oxide (ITO)) or a transparent non-conductive material (e.g., glass or plastic) coated with a transparent (e.g., ITO) (if the tip is also used for projection purposes) or opaque material, or the like. In some examples, tip 201 can have a diameter of about 1.5 mm or less. Tip 201 which can be used to transmit stimulus signals from the stylus, can be implemented using a conductive ring 203. Ring 203 can include a conductive material, such as a flexible conductor, a metal, a conductor wrapped by a non-conductor, a non-conductor coated with a metal, a transparent conducting material (e.g., ITO), a transparent non-conductive material (e.g., glass) coated with a transparent material (e.g., ITO if the tip is used for projection purposes) or opaque material, or the like. Ring 203 can serve other purposes, such as providing an alternative means for transmitting the stylus stimulation signal from the stylus to the touch sensitive device. Similarly, tip 201 or ring 203 can also be used to sense the touch drive signal from the touch sensitive device. Both tip 201 and ring 203 can be segmented and each segment can be independently controlled according to the description above.

Figure 3:
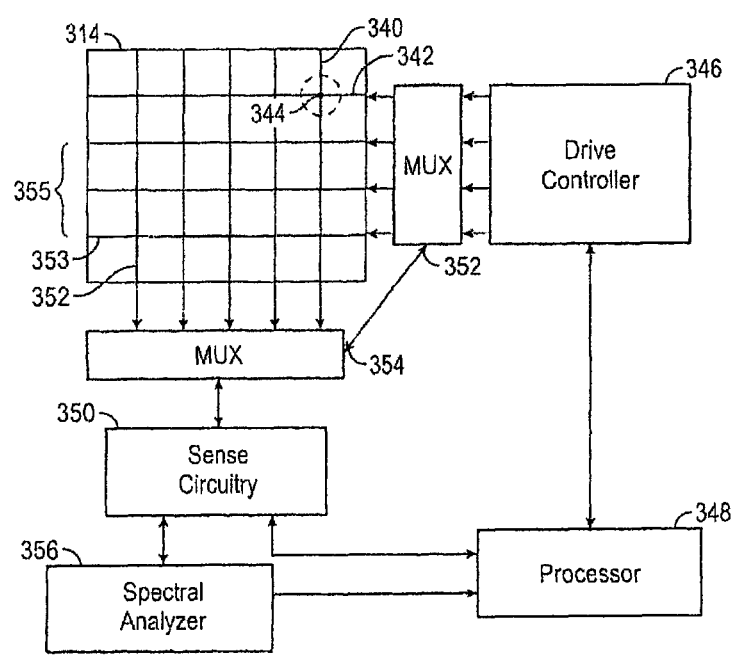
FIG. 3 illustrates a control system for a touch sensor that can detect both a user's touch and signals from a stylus according to disclosed examples.

FIG. 3 illustrates a control system for a touch sensor that can detect both a user's touch and signals from a stylus according to disclosed examples. The sensor panel 314 of the touch sensor may be configured to detect touches on the surface of the touch screen by changes in capacitance as described above in reference to FIG. 1. With reference to FIG. 3, a sensing node 344 formed by one or more electrodes (explained below) may form a first electrically conductive member and an object, such as a finger of the user, may form a second electrically conductive member. The sensor panel 314 of the touch screen may be configured in a self-capacitance arrangement or in a mutual capacitance arrangement.

In the self-capacitance arrangement, electrodes may include a single layer of a plurality of electrodes spaced in a grid or other arrangement where each electrode may form a node 344. The sensing circuit 350 can monitor changes in capacitance that may occur at each node 344. These changes typically occur at a node 344 when a user places an object (e.g., finger or tip 201 of the stylus 200) in close proximity to the electrode.

With continued reference to FIG. 3, in a mutual capacitance system, the electrodes may be separated into two layers forming drive lines 342 and sense lines 340. The drive lines 342 may be formed on a first layer and the sense lines 340 may be formed on a second layer. The nodes 344 for the sensor panel 314 may be defined at locations where the drive lines 342 may cross over or under the sense lines 340 (although they are typically placed in different layers). The sense lines 340 may intersect the drive lines 342 in a variety of manners. For example, in one example, the sense lines 340 are perpendicular to the drive lines 342, thus forming nodes 344 with x and y coordinates. However, other coordinate systems can also be used, and the coordinates of the nodes 344 may be differently defined.

A drive controller 346 can be connected to each of the drive lines 342. The drive controller 346 can provide a stimulation signal (e.g., voltage) to the drive lines 342. The sensing circuit 350 can be connected to each of the sense lines 340, and the sensing circuit 350 can act to detect changes in capacitance at the nodes 344 in the same manner as described in FIG. 1. During operation, the stimulation signal can be applied to the drive lines 342, and due to the capacitive coupling between the drive lines 342 and sense lines 340, a current can be carried through to the sense lines 340 at each of the nodes 344. The sensing circuit 350 can then monitor changes in capacitance at each of the nodes 344. In some examples, each drive line can be switchably configured to operate as sense lines, and thus a sensing circuit and multiplexer similar to 350 and 354 can be connected to the drive lines similar to the sense lines depicted in FIG. 3.

In either the self-capacitance or mutual capacitance arrangements discussed above, the sensing circuit 350 can detect changes in capacitance at each node 344. This may allow the sensing circuit 350 to determine when and where a user has touched various surfaces of the touch screen 306 with one or more objects. The sensing circuit 350 may include one more sensors for each of the sense lines 340 and may then communicate data to a processor 348. In one example, the sensing circuit 350 may convert the analog capacitive signals to digital data and then transmit the digital data to the processor 348. In other examples, the sensing circuit 350 may transmit the analog capacitance signals to the processor 348, which may then convert the data to a digital form. Further, it should be noted that the sensing circuit 350 may include individual sensors for each sensing line 342 or a single sensor for all of the sense lines 340. The sensing circuit 350 may report a location of the node 344, as well as the intensity of the capacitance (or changed thereof) at the node 344.

In some examples, the touch screen may include one or more multiplexers. For example, during touch operation, the sensing circuit 350 may also include a multiplexer configured to perform time multiplexing for the sense lines 340. For example, the sensing circuit 350 may receive signals from each of the nodes 344 along the sense lines 340 at approximately the same time. The multiplexer can store the incoming signals and then may release the signals sequentially to the processor 348 one at a time or in subsets. As discussed above, in some examples that are not pictured, the drive lines can be configured to also act as sense lines and thus can be configured with multiplexers and sense circuitry similar to the sense lines as described above.

In addition to the multiplexers that may be used to during a touch mode to process touch signals, the touch screen may also include a drive multiplexer 352 and/or a sense multiplexer 354. These two input device multiplexers 352, 354 may be in communication with the respective set of lines 342, 344 to switch between a touch mode and a stylus or input device mode. As will be discussed in more detail below, during a stylus mode, in which the sensing circuit 350 is configured to detect input from a stylus or other input device, the touch screen may selectively scan the sense lines 340, as well as the drive lines 342, in order to receive data transmitted from the tip 202 of the stylus 200. In these examples, the drive controller 346 may further be configured to sense for signals on the drive lines 342 in order to detect a signal transmitted from the tip 202 of the stylus 200. In this manner, the drive lines 342 may be configured to act as sense lines 340 and interact with the tip 202 of the stylus 200 to receive one or more signals (e.g., voltage signals). In other words, rather than providing a stimulation signal to the drive lines 342, during a stylus scan, if the stylus is transmitting, the stylus may apply a stimulation signal to the drive lines 342 (in the form of a data transmission signal).

In some examples, the drive lines 342 may be scanned after the input device has been detected by the sense lines. These examples may reduce the scanning time required for the touch screen to detect the input device, as the drive lines 342 may only be scanned in instances where the input device is actually present. Thus, if the input device is not detected, the touch screen may more quickly return to scanning for touch inputs. That said, it should be noted that when driving, the stylus 200 may provide a stimulation signal to both the sense and drive lines simultaneously and so in some instances both lines may be scanned simultaneously. However, in some examples, the sense lines 340 and drive lines 342 may be scanned and demodulated sequentially (when the input device is detected), as this type of scanning may allow the touch screen to re-use the same touch hardware for both scanning and drive line scanning. That is, the sense circuitry may be multiplexed to the drive lines, to reduce the separate components that may be required by the touch screen. The control system of FIG. 3 can also include a spectral analyzer for finding frequencies that have minimal noise.

Additionally, in some examples, the touch controller, such as the sense circuitry 350 and/or drive controller, may analyze the input or stimulation signal transmitted from the input device in order to detect the position of the input device, as well as to receive data communication. In other words, the input signal may be used to detect location, and the same signal may be encoded with data from the input device.

Figure 4:
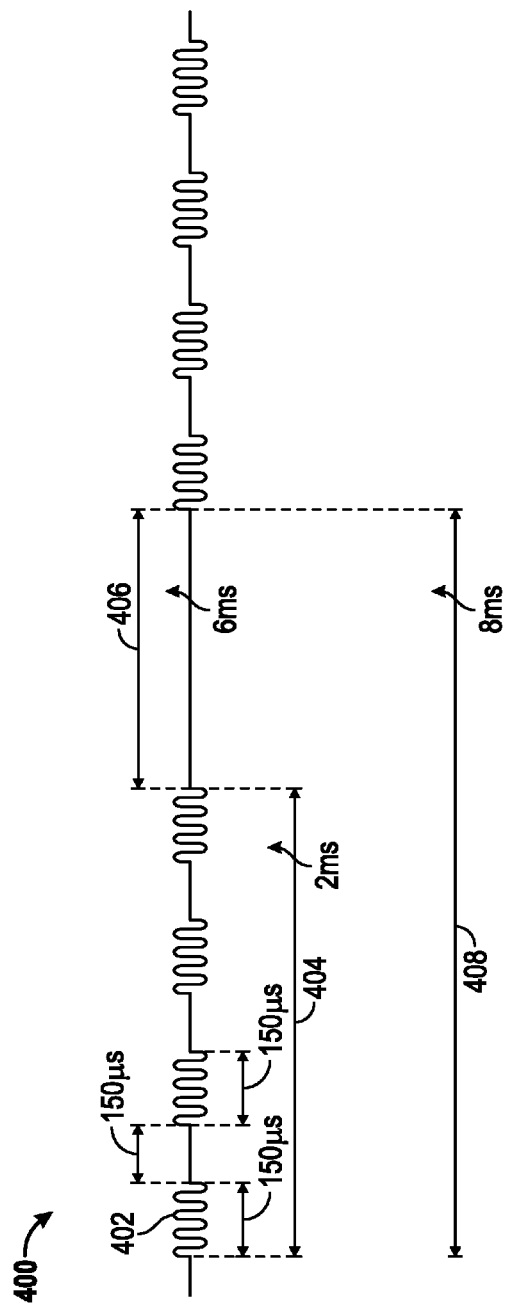
FIG. 4 illustrates an example stylus signal waveform according to examples of the disclosure.

FIG. 4 illustrates an example stylus signal waveform according to examples of the disclosure. In this example, stylus signal 400 can contain multiple steps 402. Each step can be of a pre-determined time period; in the example of FIG. 4 the time period can be 150 µs. During the step, a sinusoidal signal at a given frequency can be transmitted as the signal. During the time periods in between steps, no signal at the same frequency can be transmitted by the stylus. A grouping of steps can be called a burst. As illustrated, a group of four steps can be called a burst 404. If each step 402 can be 150 µs and each gap between steps can be 150 µs, then each burst can be approximately 2 ms. The time between bursts can also be pre-determined. In the example of FIG. 4, the time between burst 406 can be 6 ms in duration. In other words, between the last step of burst 404 and the next burst, there can be 6 ms where no signal is transmitted.

Figure 5:
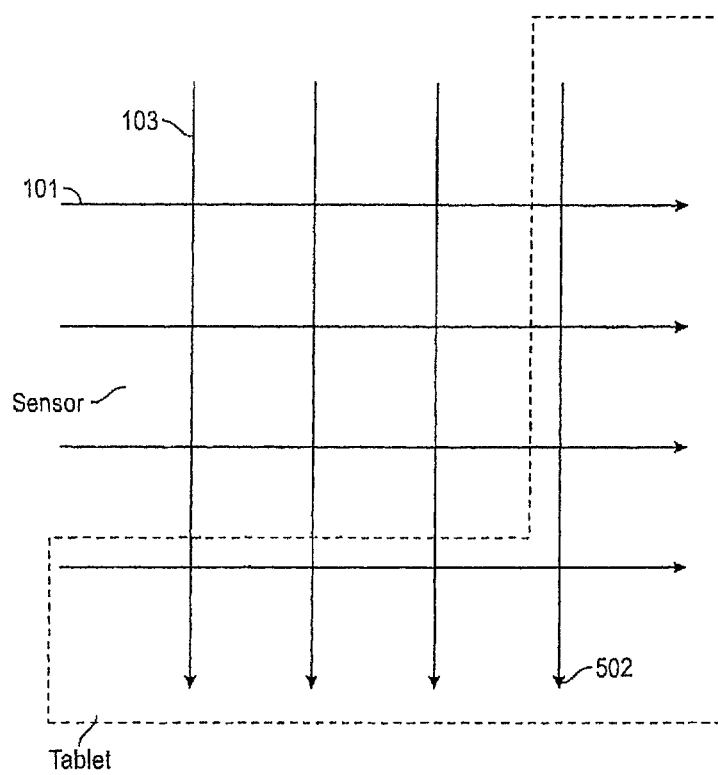
FIG. 5 illustrates an example touch/stylus demodulation circuit according to examples of the disclosure.

FIG. 5 illustrates an example stylus receiver circuit according to examples of the disclosure. As described above, during a touch operation, the drive lines 101 can transmit a stimulation signal that can be received via the sense lines 103 due to mutual capacitance between the drive lines and sense lines. As illustrated in FIG. 5, when the device is in a stylus searching mode or stylus active mode (described in further detail below), the drive lines 101 and the sense lines 103 can be configured to receive stylus signals. Each electrode of the drive and sense electrodes 101 and 103 can be coupled to a receiver 502. As described above in a touch sensing mode, the drive lines can be coupled to signal generators that generate a stimulation signal, and the sense lines can be coupled to receivers in order to receive signals indicative of a touch occurring on the touch sensor panel. In a stylus searching mode or a stylus active mode, both the drive lines 101 and sense lines 103 can be coupled to receivers 502 in order receive signals generated by the stylus. Thus, on a touch sensor panel that has, for example, 40 rows and 30 columns, there can be 70 total stylus receive channels. On the columns/sense lines 103, the receive circuitry can be used for both touch and stylus. On the rows/drive lines 101, the electrodes can be switchably configured to be coupled to drive lines during a touch sensing operation and receivers during a stylus sensing operation.

Figure 6:
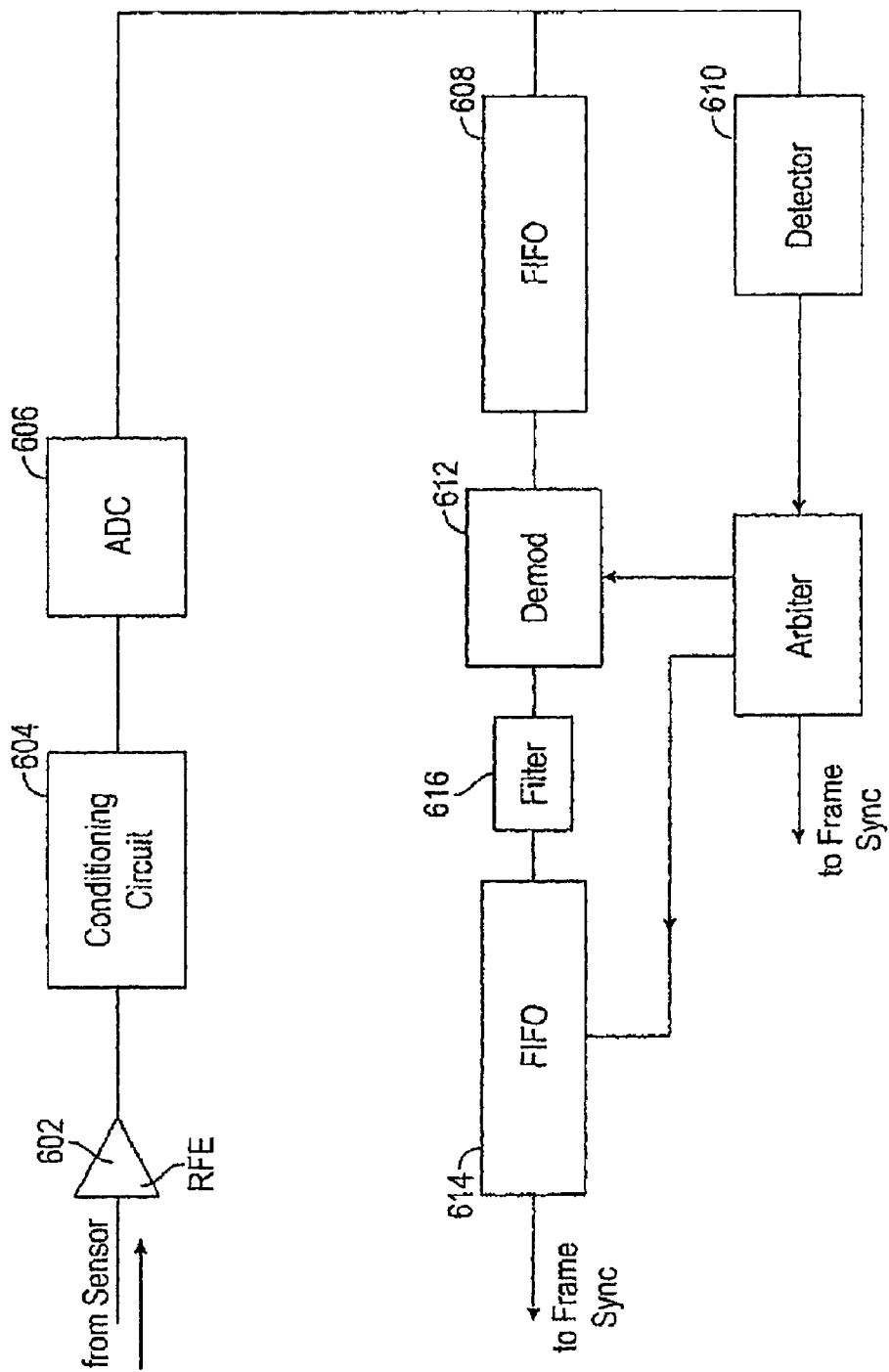
FIG. 6 illustrates a stylus signal receiver according to examples of the disclosure.

FIG. 6 illustrates a stylus signal receiver according to examples of the disclosure. A drive line 101 or sense line 103, which in a stylus detection mode become electrodes, act as inputs to a receiver front end (RFE) 602. RFE 602 can provide any analog signal processing needs, including, for example: amplification, filtering, attenuation, etc. The output of RFE 602 can be sent to conditioning circuit 604. Conditioning circuit 604 can condition the signal to be digitized by analog-to-digital converter 606 by providing filtering, buffering etc. At ADC 606, the analog signal can be converted to digital samples; the output of the ADC can then be fed into first-in-first-out buffer 608 and stylus detector 610. Stylus detector 610 can perform a single frequency windowed discrete Fourier transform of the signal, with the window sliding as a function of time, in order to detect peak energy within the window. The peak can be indicative of the end time of stylus signal. A more detailed discussion of the stylus detector can found in U.S. patent application Ser. No. 13/830,399 entitled "Stylus Signal Detection and Demodulation Architecture".

The detector 610 can determine the end and beginning times of a detected stylus step. This information can be sent to an arbiter 802 (described below) and can also be sent to a burst FIFO 614 as well as a demodulator 612. Demodulator 612 can take, as its input, the output of FIFO 608. The demodulator 612 can thus receive a delayed version of the signal being output by ADC 606. When the demodulator 612 receives the start time and end time of a detected stylus signal, it can coordinate demodulation of the signal with the output of the FIFO such that demodulation occurs only during the detected beginning and end of the stylus signal. In other words, while the detector receives the stylus signal in real time, the demodulator will get a delayed version of the signal, with delay time being adequate enough to allow the detector to report to the demodulator the beginning and end time of the stylus signal. By the time the stylus signal exits the FIFO 608, the demodulator can know when to act on the signal in order to demodulate it. The output of the demodulator 612 can then be inputted into burst FIFO 614. The arbiter 802 can relay the start time and end time of the stylus step signal to the burst FIFO 614. Burst FIFO 614 can feed the appropriate data that occurred during the time period between the estimated start and stop time of the stylus step to a frame synchronizer (discussed below).

Figure 7:
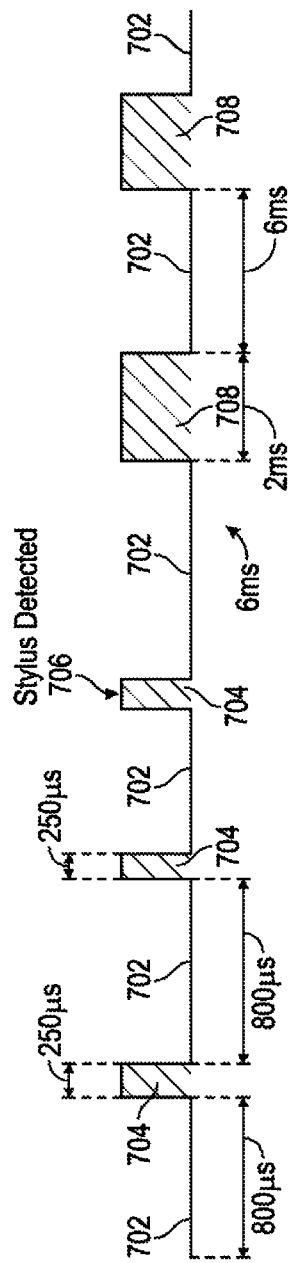
FIG. 7 illustrates an example of a touch and stylus sensing timing arrangement according to examples of the disclosure.

Since the drive lines can switch their configurations depending on whether the device is detecting touch or detecting stylus signals, the operation of the device in a touch detection mode and stylus detection mode can be time multiplexed in order to allow the device to perform both touch and stylus operations. FIG. 7 illustrates an example of a touch and stylus sensing timing arrangement according to examples of the disclosure. As time progresses from left to right in the timing diagram of FIG. 7, the device can switch between touch detection mode 702 and various stylus detection modes. In this example, touch mode 702 can alternate with stylus detection mode 704. During the period of time where touch mode 702 is alternating with stylus detection mode, the touch mode can be 800 μs in duration while stylus mode can be 250 μs.

During stylus detection mode, the device can be actively searching for a stylus signal as described above, and if no stylus signal is found during the period of time allotted to stylus detection mode 704, the device can return to touch detection mode 702. However if a stylus signal is detected during stylus detection mode 704, the timing between touch detection and the stylus modes can be altered. For instance, in the example of FIG. 7, if a stylus is detected at time 706 during a stylus detection mode 704, the device can shift into a stylus active mode. During stylus active mode, the device can detect the location of stylus signals and demodulate any incoming stylus signals, the same as stylus detection mode 704; however, the timing can be synchronized with the burst/step patterns described in FIG. 4. For instance, when a stylus is first detected at time 706, the beginning of the next touch detection mode 702 can be synchronized with the time between stylus bursts 406, which in the example of FIG. 4 is 6 ms. Thus, as illustrated in FIG. 7 when the stylus is detected at time 706, the next touch detection mode 702 can last for 6 ms while the stylus is between bursts. The stylus detection modes that come after can be approximately 2 ms, which can correspond to the time required by the stylus to transmit a burst. In this way, the touch detection mode can be timed to occur between bursts when the stylus is not generating a signal, and the stylus active mode can correspond to a period of time when a stylus burst is expected to arrive on the device. If the device does not detect a stylus during a pre-determined number of stylus active mode time periods 708, the device can return to the timing scheme illustrated at the beginning of the timing diagram and alternate touch and stylus in 800 μs and 250 is time periods, respectively.

Figure 8:
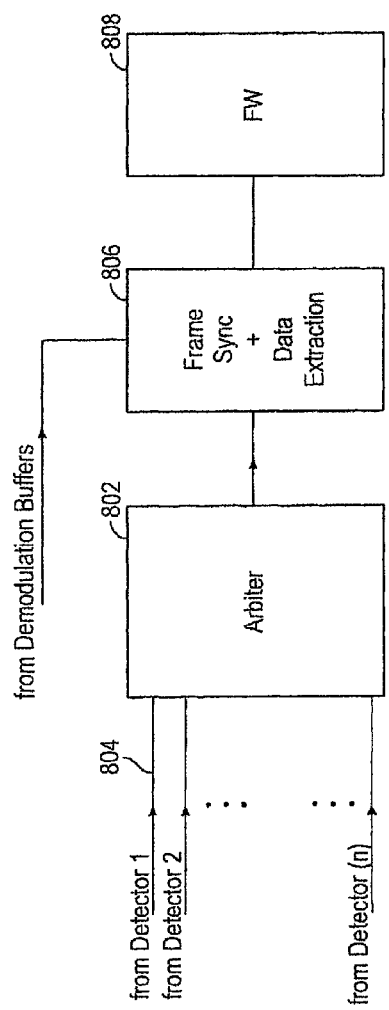
FIG. 8 illustrates an exemplary stylus detection and demodulation device according to examples of the disclosure.

FIG. 8 illustrates an exemplary stylus detection and demodulation device according to examples of the disclosure. As illustrated in FIG. 8, the output of each individual detector corresponding to a stylus signal channel can be inputted into arbiter 802. Each detector 804 can relay information to the arbiter 802 about the stylus signals it has detected. For instance, each detector can relay information regarding whether or not a stylus signal was detected on that detector; if a stylus signal was detected it can relay to the arbiter the estimated beginning and end times of an estimated step, and it can also relay metrics about the detected signal. Metrics can include information related to the strength of the signal detected by the detectors, for instance the magnitude of detected stylus signal, the number of zero-crossings detected, or the number of crossings of a pre-determined non-zero threshold. By relaying a metric about the detection, each detector can alert the arbiter as to the level of fidelity of the detection.

The arbiter can scan the information relayed by each detector to determine the detector most likely to have the most accurate measurement of the beginning and end time of the stylus step. When the arbiter determines the "winning" detector, it can output a signal to all stylus signal receive channels like those depicted in FIG. 6. The signal sent by the arbiter of the device can tell each receive channel the estimated start and start time of the stylus step. Referring to FIG. 6, each the arbiter signal can be received by FIFO 614. FIFO 614 can extract the data corresponding to the estimated start and stop time received from the arbiter 802 and send it to Frame Sync Module 806.

Frame Sync module 806 can receive data from each burst FIFO 614 of each stylus detection receive channel. Frame Sync module 806 can create frames of data, each frame of data corresponding to a given scan of the channels. When one frame of data is acquired, another frame can be created that corresponds to another scan of the stylus signal receive channels. The frame sync module 806 can time the beginning of the next frame of data to correspond with an individual detected burst. In this way, the data frames are synchronized to the stylus signals being generated by the stylus after each individual burst. By synching the stylus signals being generated to the device after every burst, any clock drift associated with differing phases between the device and the stylus can be mitigated. This module could be implemented in firmware or hardware.

The frame sync module can also perform data extraction. In other words, the data that is encoded within a stylus signal can be decoded. In one example, data can be encoded into the stylus signal by modulating the phase difference between successive steps of a stylus burst. Referring to FIG. 4, step 402 can have a given phase. The next step of the burst can have another phase value. The difference in phases between the first step and the any step can be used to encode data using a standard differential phase shift keying (DPSK) technique and can be demodulated by using standard DPSK demodulation techniques. While DPSK is given as an example, the disclosure is not so limited and data can be encoded in numerous ways such as frequency shift keying (FSK), amplitude shift keying (ASK), quadrature amplitude modulating (QAM) and other various modulation and demodulation techniques known to one of skill in the art.

Once the data is decoded, the frame sync module can send the frames to firmware to determine the position of the stylus by analyzing each received frame of data and finding the channels with the highest magnitude signal in the rows (X direction) and the channels with the highest magnitude in the columns (Y-direction) and performing a centroid operation on each axis.

Figure 9:
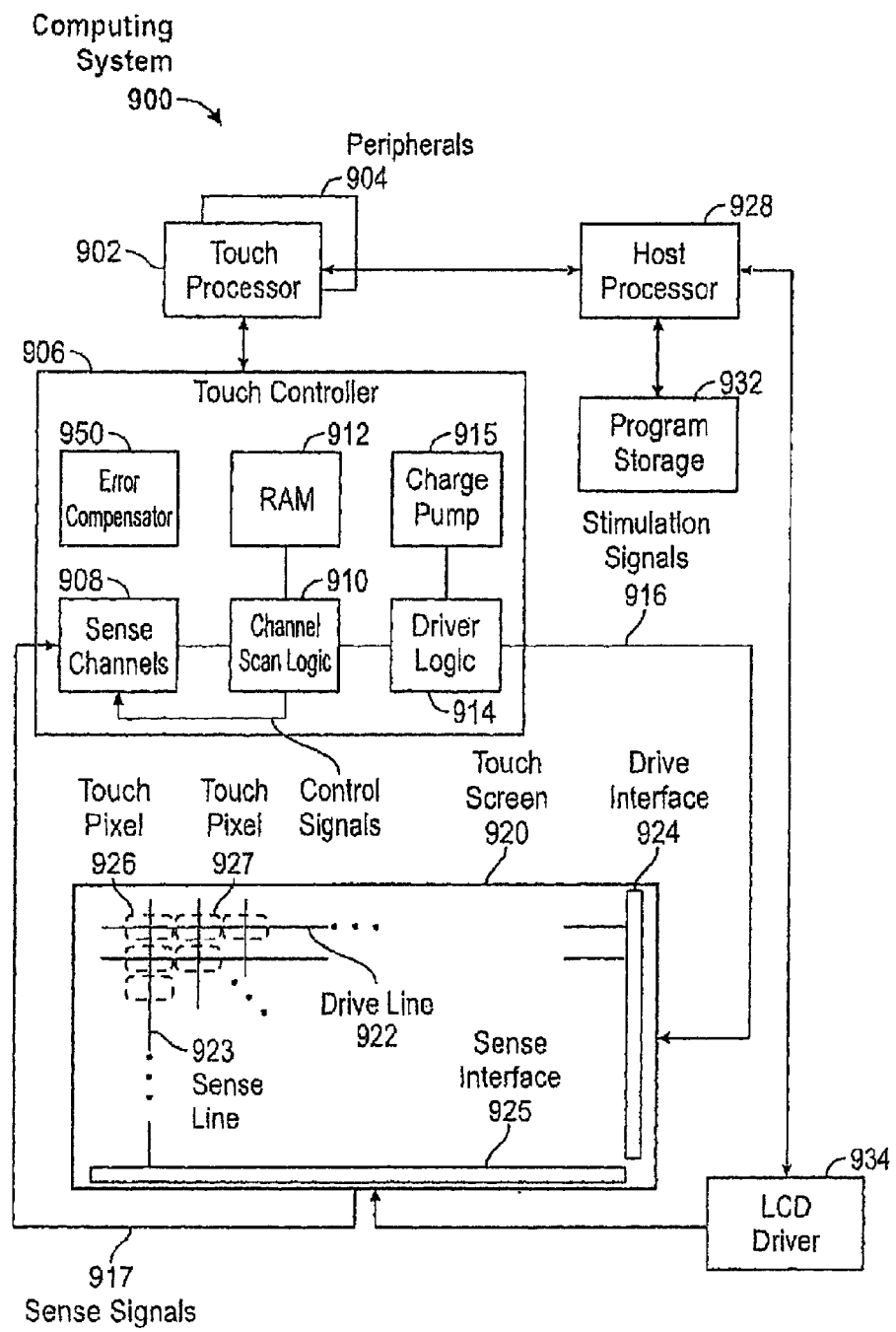
FIG. 9 is a block diagram of an example computing system that illustrates one implementation of a touch sensor panel display with stylus signal noise correction according to examples of the disclosure.

FIG. 9 is a block diagram of an example computing system that illustrates one implementation of a touch sensor panel display with stylus detection and demodulation according to examples of the disclosure. Computing system 900 could be included in, for example, mobile telephone 136, digital media player 140, personal computer 144, or any mobile or non-mobile computing device that includes a touch screen. Computing system 900 can include a touch sensing system including one or more touch processors 902, peripherals 904, a touch controller 906, and touch sensing circuitry. Peripherals 904 can include, but are not limited to, random access memory (RAM) or other types of memory or storage, watchdog timers and the like. Touch controller 906 can include, but is not limited to, one or more sense channels 909, channel scan logic 910 and driver logic 914. Channel scan logic 910 can access RAM 912, autonomously read data from the sense channels and provide control for the sense channels. In addition, channel scan logic 910 can control driver logic 914 to generate stimulation signals 916 at various frequencies and phases that can be selectively applied to drive regions of the touch sensing circuitry of touch screen 920, as described in more detail below. In some examples, touch controller 906, touch processor 102 and peripherals 904 can be integrated into a single application specific integrated circuit (ASIC).

Computing system 900 can also include a host processor 928 for receiving outputs from touch processor 902 and performing actions based on the outputs. For example, host processor 928 can be connected to program storage 932 and a display controller, such as an LCD driver 934. Host processor 928 can use LCD driver 934 to generate an image on touch screen 920, such as an image of a user interface (UI), and can use touch processor 902 and touch controller 906 to detect a touch on or near touch screen 920, such a touch input to the displayed UI. The touch input can be used by computer programs stored in program storage 932 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 929 can also perform additional functions that may not be related to touch processing.

Integrated display and touch screen 920 can include touch sensing circuitry that can include a capacitive sensing medium having a plurality of drive lines 922 and a plurality of sense lines 923. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 922 can be driven by stimulation signals 916 from driver logic 914 through a drive interface 924, and resulting sense signals 917 generated in sense lines 923 can be transmitted through a sense interface 925 to sense channels 909 (also referred to as an event detection and demodulation circuit) in touch controller 906. In this way, drive lines and sense lines can be part of the touch sensing circuitry that can interact to form capacitive sensing nodes, which can be thought of as touch picture elements (touch pixels), such as touch pixels 926 and 927. This way of understanding can be particularly useful when touch screen 920 is viewed as capturing an "image" of touch. In other words, after touch controller 906 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 10:
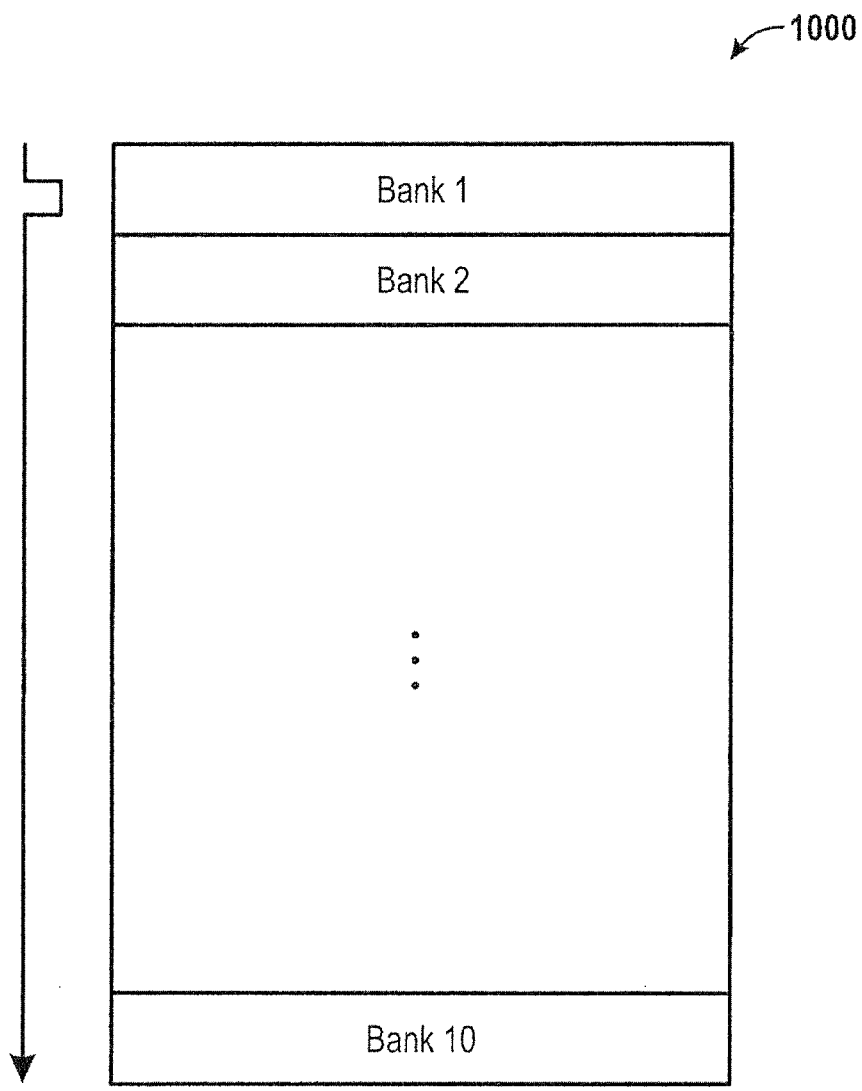
FIG. 10 illustrates a touch sensor panel bank partition scheme according to examples of the disclosure.

Touch images can be acquired, in one example, by separating the touch sensor panel into "banks" with each bank containing a certain number of rows within it. FIG. 10 illustrates a touch sensor panel bank partition scheme according to examples of the disclosure. Each bank can contain a plurality of rows. Touch data can be acquired on a bank by bank basis. A touch image can be acquired when touch data from each bank is collected. In the example of FIG. 10, touch sensor panel 1000 can be partitioned into banks 1-10. In a touch sensor panel with 40 rows as an example, each bank can contain four rows. During acquisition of a bank, touch data is acquired for the four rows within the bank as described above. When data is collected from banks 1-10, a touch image can be rendered.

Figure 11:
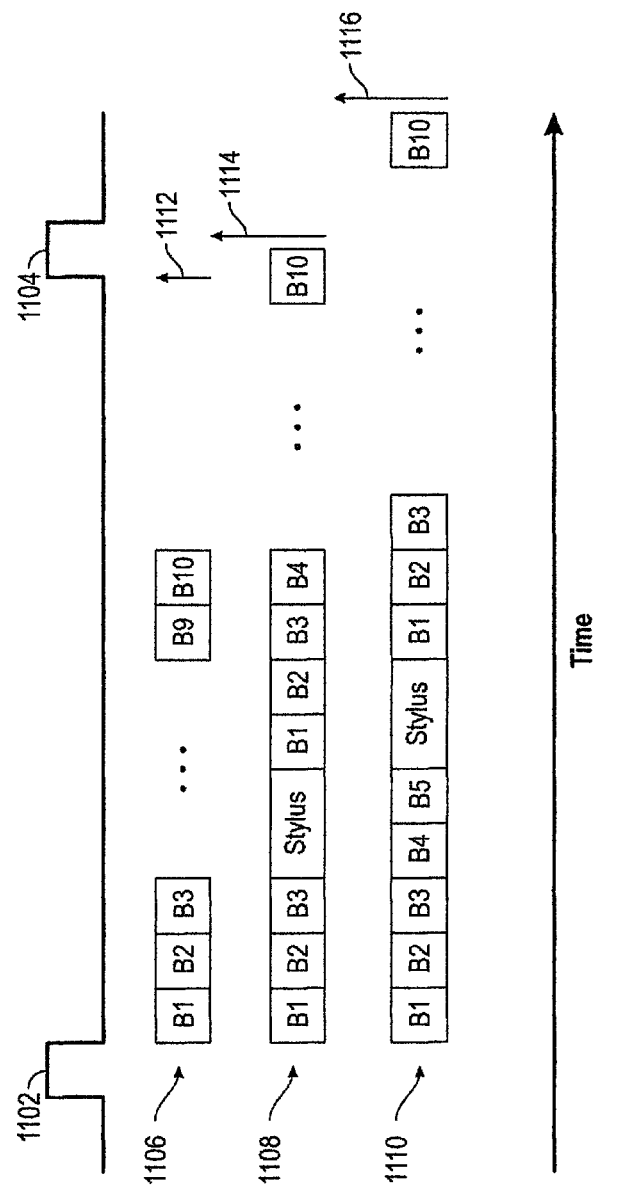
FIG. 11 illustrates an example synchronization scheme between touch image acquisition and display refresh according to examples of the disclosure.

Touch images and display images can be synchronized with each other in order to ensure that a touch image is refreshed at substantially the same refresh rate as the display. In some examples, the touch image can be refreshed in between vertical sync pulses provided by the display. As in known in art, vertical synchronization pulses (Vsync) can be generated by the display to signify the beginning and end of a screen refresh. The touch image can be synchronized to the generation of Vsync. FIG. 11 illustrates an example synchronization scheme between touch image acquisition and display refresh according to examples of the disclosure. As illustrated in FIG. 11, Vsync pulse 1102 can be generated by the display controller to signify the end or beginning of a display refresh cycle. Vsync can be a periodic signal that has a given period. Pulse 1104 can represent the next pulse after 1102 to be generated by the display controller. In between pulse 1102 and pulse 1104, the touch image can be acquired. In one example, exemplified by timeline 1106, when pulse 1102 is generated by the display controller, touch image acquisition can begin with the acquisition of touch data from bank 1. Each bank can subsequently be acquired as shown in the figure. After bank 10 is acquired, the touch controller can wait until the arrival of pulse 1104 to send the touch image to the device as represented by the arrow at 1112. In this way, the touch images can be refreshed at substantially the same rate as the display is being refreshed. The acquisition of touch data can start a known point to the display scan (i.e., a Vsync pulse). In between Vsync pulses, banks B1-B10 can be acquired, and the data reported out to the device at the time the next Vsync pulse is asserted. By synchronizing the display refresh rate and the touch image refresh rate, touch inputs to the device can be displayed smoothly without any jumps or tears.

The timing described above, however, may only apply in a touch-only scenario in which there is no stylus mode. Timeline 1108 can represent a timing diagram of touch and stylus signal acquisition according to examples of the disclosure. In the example of timeline 1108, which assumes that the touch sensor panel is already in stylus active mode, banks B1-B3 can be acquired in the same manner as timeline 1106. However, before the acquisition of B4, a stylus signal scan may be scheduled in accordance with the stylus active mode described above. In order to synchronize the touch with the stylus scans, the touch sensor panel may restart the touch scan and scan banks 1-10 after the stylus scan time period has passed. In this manner, the touch scan can be synchronized to the stylus scan since the touch images are being refreshed at the stylus scan rate. As shown in timeline 1108, once a stylus scan period has passed, the touch data is acquired starting at bank 1. Once bank 10 has been acquired, the touch image can be sent to the device. However, as illustrated in timeline 1108 of FIG. 11, because the touch scan started over after a stylus scan in order to synchronize the touch scan to the stylus scan, the reporting of the data indicated by arrow 1114 could occur at a different point in time in comparison to the reporting of the data in timeline 1106. The data of bank 1 can be acquired at substantially the same time as pulse 1102, and thus the data could be acquired in time to report the data at pulse 1104. However, at timeline 1108, the touch image was not acquired in time to report at pulse 1104. Therefore, by having the touch scan synchronize to the stylus scan, the touch and stylus scan may no longer be synchronized to the display scan. Timeline 1110 illustrates another exemplary touch and stylus data acquisition example. In this example, the stylus scan occurs after bank 5 is acquired. After the stylus scan, the touch data acquisition starts over at bank 1. Once the entire touch sensor panel is scanned, the data is reported as indicated by 1116. Because the stylus scan occurred at different points in time in timeline 1108 and 1110, the data report time of each timeline can differ as indicated by the difference in time between 1114 and 1116. Inconsistent reporting times of touch data can degrade the user's experience when using the device. If the reporting time of touch data occurs at arbitrary times as opposed to being synchronized with the display refresh, certain display operations that depend on touch or the stylus (i.e., scrolling or dragging) may appear jumpy rather than smooth.

Figure 12:
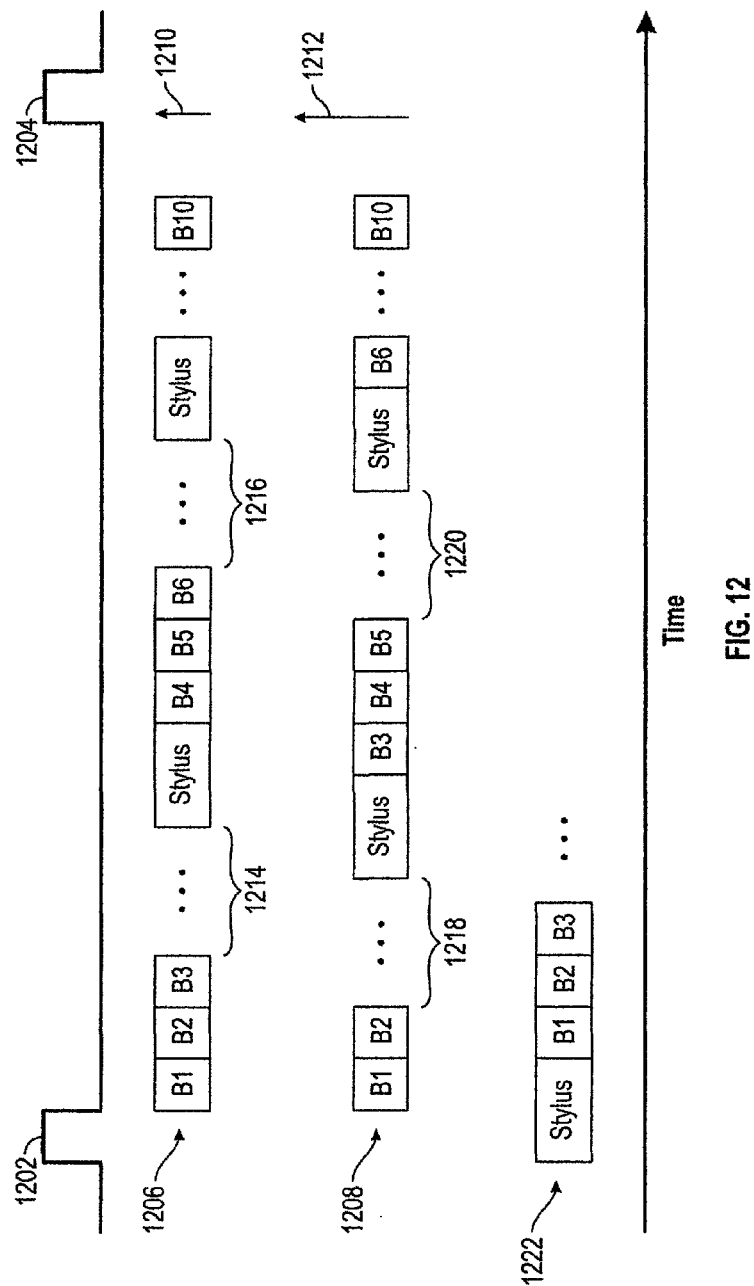
FIG. 12 illustrates another exemplary synchronization scheme between touch image acquisition and display refresh according to examples of the disclosure.

FIG. 12 illustrates another exemplary synchronization scheme between touch image acquisition and display refresh according to examples of the disclosure. Similar to the scheme illustrated in FIG. 11, touch data acquisition can occur in the time period between Vsync pulses 1202 and 1204. Also similar to the scheme depicted in FIG. 11, the acquisition of the first bank labeled B1 in the diagram can be synchronized to pulse 1202. The touch sensor panel can subsequently acquire successive banks B2, B3, etc. Assuming the device is in active stylus mode after scanning an individual bank, the touch controller can check to see if it has time to scan another bank before the next stylus scan period is set to begin. Turning to the example depicted in timeline 1206 of FIG. 12, after B1 is scanned the device can determine that it has enough time to scan B2. After B2 is scanned, the device can determine that it has enough time before a stylus scan to acquire B3. After B3 is scanned, the device can determine that a stylus scan is going to occur too soon to allow for the acquisition of B4 prior to the scan. The device can wait until the stylus scan occurs, as depicted in the time gap 1214 in which the device is neither acquiring touch nor stylus signals. Once the stylus scan has passed, in contrast to starting over the scan as illustrated in FIG. 11, the device can simply continue where it left off. In the example of timeline 1206, it can resume with B4. The process can repeat multiple times within a single touch image acquisition. For instance, after acquiring B6, the device can wait at 1216 for another stylus scan to occur. Eventually, after B10 is acquired, the touch data can be reported at 1210 which can be synchronized with pulse 1204. In this manner, the touch acquisition, stylus acquisition, and display refresh can be synchronized.

Timeline 1208 illustrates another example of the scheme depicted at timeline 1206. In this example, the stylus scan can occur at a different point in time than the example of timeline 1206, however the data can be reported out at 1212 which is at substantially the same time as the example of timeline 1206 at 1210. Thus, since the reporting time is synchronized to the display, and since the touch is also synchronized to the stylus scan, the touch system, stylus system and the display system can be said to be synchronized. Timeline 1222 can represent a scenario in which a stylus scan can overlap with a Vsync pulse, thereby preventing the acquisition of B1 to occur in a synchronous manner with the Vsync pulse. In that instance, the acquisition of B1 can be aligned to the time B2 would have started had the stylus scan not been present during the assertion of Vsync. As shown in timeline 1222, at 1224 the data can be reported out at substantially the same time as the assertion of pulse 1204.

Figure 13:
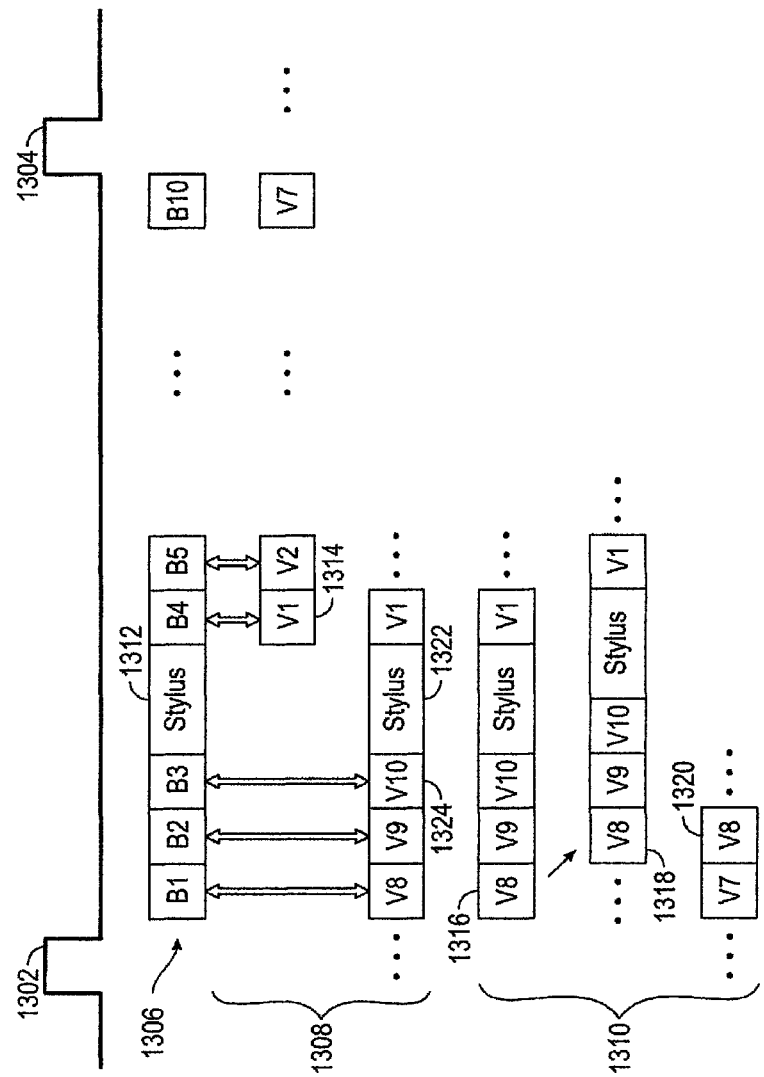
FIG. 13 illustrates an example display, touch and stylus synchronization scheme that utilizes virtual mapping according to examples of the disclosure.

In other examples of the disclosure, the touch scan can be synchronized to the stylus scan and the display refresh via virtual mapping. FIG. 13 illustrates an example display, touch and stylus synchronization scheme that utilizes virtual mapping according to examples of the disclosure. Similar to the examples illustrated in FIGS. 11 and 12, timeline 1306 illustrates an example acquisition of banks of touch data. Like the previous examples, the first bank B1 can be acquired at substantially the same time as the assertion of pulse 1302, while the touch data can be reported to the device at the assertion of pulse 1304. Like in previous examples, a stylus scan can occur in between acquisitions of bank data. In the example of timeline 1306, when a first stylus scan 1312 occurs, the bank acquisition is interrupted but can resume with the next bank to be acquired, which in the example of timeline 1306 can be B4. In this way, the touch can be synchronized to the stylus; however, by synchronizing itself to the stylus, the touch may lose synchronization to the display as discussed above.

Timeline 1308 illustrates a virtual mapping scheme that can allow the touch and stylus to be synchronized with the display. When the first stylus scan occurs at 1312 in timeline 1306, the firmware of the touch sensitive device can create a virtual timeline 1308 that begins after the first stylus scan on the physical timeline 1306. After the first stylus scan 1312 in the physical timeline 1306 occurs, the device can transition from a stylus ready mode to a stylus active mode as discussed above. Once in the stylus active mode, the device may need to know when an entire touch image has been acquired while the device was in an active stylus mode. In the example of FIG. 11, the touch scan restarted from bank 1 after the device entered stylus scan, which then led to a loss of synchronization between the touch data and the display refresh; however, it was known when an entire touch image had been acquired in stylus active mode. In the example of FIG. 13, rather than restarting the acquisition of the touch data at bank 1, the touch device can create a virtual bank and then map the virtual bank to a physical bank. For instance, as illustrated in timeline 1308, at 1314, the firmware of the touch device can create virtual bank 1 (V1) upon completion of the first stylus scan. The firmware of the device can also map V1 to a physical bank. In the example illustrated, virtual bank V1 can be mapped to physical bank B4. By knowing the mapping, even though the data is still reported to the device after physical bank 10 is acquired at pulse 1304, the device can know that a touch image in stylus active mode has not been fully rendered. At 1324, by having knowledge of the mapping between the physical banks and the virtual banks, the device can know that a touch image has been completed after V10, which can correspond to physical bank B3. In this way, even though the data is reported out at pulse 1304, thus synchronizing touch to the display, the device can synchronize the touch to the stylus by knowing the mappings between the physical bank and the virtual bank.

Over time, because the touch and stylus data are tightly synchronized, while the display is refreshed (i.e. Vsync pulses are generated) from a different clock source, phase drift between the two clocks can cause the virtual mapping to become inaccurate over time. For instance, as illustrated at timeline 1310, at time 1316 V10 can be mapped to physical bank B1. At time 1318, due to phase drift, V10 can drift away from B1; however the device can still map the data collected at B1 to V10. At time 1320, the phase drift can become severe enough such that the mapping initially created may no longer be valid. As shown at time 1320, the data collected at V10 can correspond to physical bank B2 rather than B1.

In order to correct for the potential errors associated with the phase drift between the clocks, the firmware can "reassess" its mapping between the physical bank and virtual bank. In one example, at each Vsync pulse provided by the display, the device can check to see the relationship between the physical bank being collected at that time and the virtual bank that the firmware is collecting at that time. If, while reassessing the mapping, the device determines that the physical bank being collected at the time corresponds to a different virtual bank, then the device can reshuffle the mapping to correct for the error created by the phase shift. For instance, at time 1320, since V12 now corresponds to B2 rather than B1 as it did previously, the device can reshuffle the mapping such that B2 corresponds to V12, B3 corresponds to V13, etc.

Figure 14:
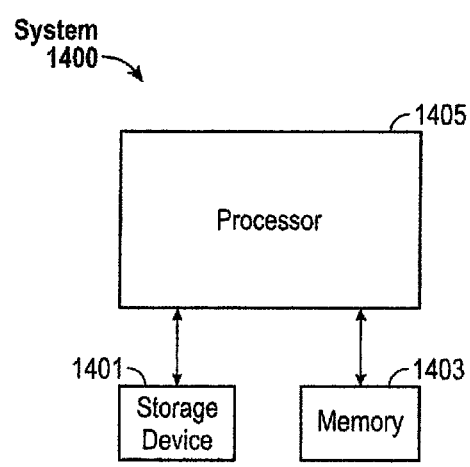
FIG. 14 illustrates an exemplary system for generating or processing a stylus stimulation signal according to examples of the disclosure.

One or more of the functions relating to stylus, touch and display scan synchronization described above can be performed by a system similar or identical to system 1400 shown in FIG. 14, which can be a part of the system of FIG. 9. System 1400 can include instructions stored in a non-transitory computer readable storage medium, such as memory 1403 or storage device 1401, and executed by processor 1405. Processor 1405 can include either of both of touch and host processors 902 and 928 shown in FIG. 9, where those processors are capable of providing control signals for controlling the display and also the touch panel to perform touch scans, stylus scans, and display scans according to the examples disclosed herein. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the system is not limited to the components and configuration of FIG. 14, but can include other or additional components in multiple configurations according to various examples. Additionally, the components of system 1400 can be included within a single device, or can be distributed between multiple devices.

Figure 15A:
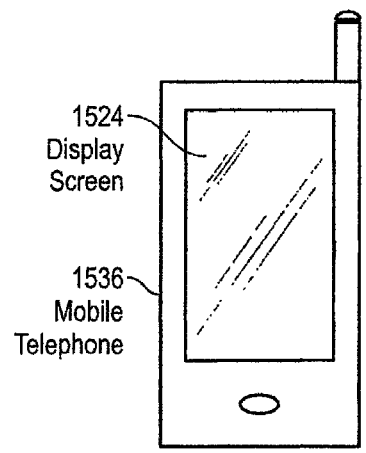
FIGS. 15A-D illustrate exemplary personal devices that include a touch screen (touch and display) capable of being synchronized with a stylus according to various examples.
Figure 15B:
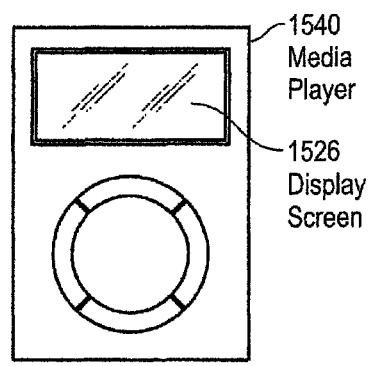
Figure 15C:
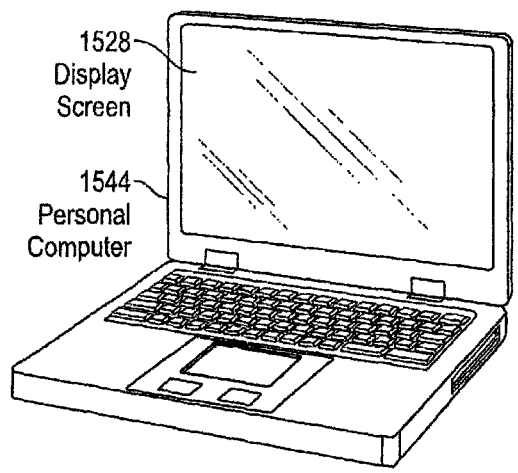
Figure 15D:
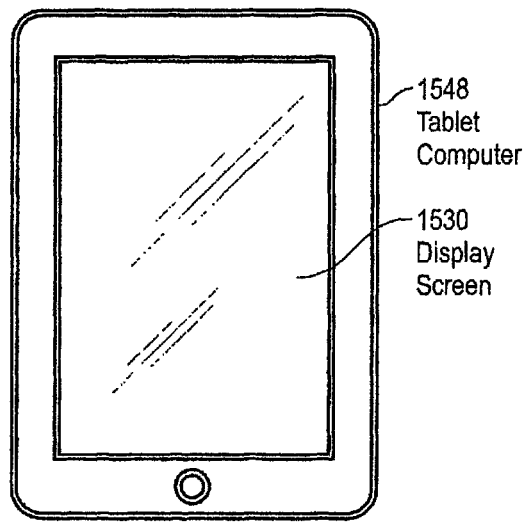

FIGS. 15A-15D show example systems in which a stylus signal detection and demodulation architecture that can allow for the stylus, display, and touch to be synchronized with one another according to examples of the disclosure may be implemented. FIG. 15A illustrates an example mobile telephone 1536 that includes a touch screen 1524 capable of synchronizing with stylus input. FIG. 15B illustrates an example digital media player 1540 that includes a touch screen 1526 capable of synchronizing with stylus input. FIG. 15C illustrates an example personal computer 1544 that includes a touch screen 1528 capable of synchronizing with stylus input. FIG. 15D illustrates an example tablet computing device 1548 that includes a touch screen 1530 capable of synchronizing with stylus input.

Therefore, according to the above, some examples of the disclosure are directed to A method for synchronizing a touch data acquisition process, a stylus data acquisition, and a display refresh process, the method comprising: synchronizing the touch data acquisition process to the display refresh process; detecting a presence of a stylus signal and initiating a stylus data acquisition process when the presence of a stylus signal is detected; synchronizing the touch data acquisition process to the stylus data acquisition process; and synchronizing both the touch data acquisition process and the stylus data acquisition process to the display refresh process. Additionally or alternatively to one or more of the examples disclosed above, in some examples, synchronizing the touch data acquisition process to the display refresh process includes beginning the touch data acquisition process at substantially the same time as a first pulse generated by a display controller. Additionally or alternatively to one or more of the examples disclosed above, in some examples, synchronizing the touch data acquisition process to the stylus data acquisition process includes determining if there is sufficient time to perform a scheduled touch scan before a next scheduled stylus scan, and if there is insufficient time, delaying the scheduled touch scan until the next scheduled stylus scan has concluded. Additionally or alternatively to one or more of the examples disclosed above, in some examples, the touch data acquisition process includes acquiring touch data from a plurality of physical banks of the touch sensor panel, and wherein the touch data acquisition process includes sequentially scanning multiple physical banks of the plurality of physical banks. Additionally or alternatively to one or more of the examples disclosed above, in some examples, synchronizing both the touch data acquisition process and the stylus data acquisition process to the display refresh process further comprises: creating a set of virtual banks, wherein a first virtual bank in the set of virtual banks corresponds to the touch data associated with a first physical bank of data scanned after a first stylus scan of the stylus data acquisition process; and mapping a plurality of virtual banks in the set of virtual banks to corresponding physical banks in the touch data acquisition process. Additionally or alternatively to one or more of the examples disclosed above, in some examples, synchronizing both the touch data acquisition process and the stylus data acquisition process to the display refresh process further includes re-mapping the virtual banks to physical banks in the touch data acquisition process if a phase drift between an acquisition of the set of virtual banks and the acquisition of the physical banks causes a prior mapping of the virtual banks to the physical banks to become inaccurate. Additionally or alternatively to one or more of the examples disclosed above, in some examples, synchronizing the touch data acquisition process to the display refresh process includes acquiring data from a first physical bank of the touch data acquisition process at substantially a same time as a first pulse generated by a display controller.

Some examples of the disclosure are directed to an apparatus capable of synchronizing a touch data acquisition process, a stylus data acquisition process and a display refresh process, the device comprising: a touch controller capable of sending signals to and receiving signals from a touch screen and performing a touch data acquisition process and a stylus data acquisition process; a display controller capable of refreshing an image displayed on the touch screen; and one or more processors capable of: synchronizing the touch data acquisition process to the display refresh process; detecting a presence of a stylus signal and initiating a stylus data acquisition process when the presence of a stylus signal is detected; synchronizing the touch data acquisition process to the stylus data acquisition process; and synchronizing both the touch data acquisition process and the stylus data acquisition process to the display refresh process. Additionally or alternatively to one or more of the examples disclosed above, in some examples, synchronizing the touch data acquisition process to the display refresh process includes beginning the touch data acquisition process at substantially the same time as a first pulse generated by a display controller. Additionally or alternatively to one or more of the examples disclosed above, in some examples, synchronizing the touch data acquisition process to the stylus data acquisition process includes determining if there is sufficient time to perform a scheduled touch scan before a next scheduled stylus scan, and if there is insufficient time, delaying the scheduled touch scan until the next scheduled stylus scan has concluded. Additionally or alternatively to one or more of the examples disclosed above, in some examples, the touch data acquisition process includes acquiring touch data from a plurality of physical banks of the touch sensor panel, and wherein the touch data acquisition process includes sequentially scanning multiple physical banks of the plurality of physical banks. Additionally or alternatively to one or more of the examples disclosed above, in some examples, synchronizing both the touch data acquisition process and the stylus data acquisition process to the display refresh process further comprises: creating a set of virtual banks, wherein a first virtual bank in the set of virtual banks corresponds to the touch data associated with a first physical bank of data scanned after a first stylus scan of the stylus data acquisition process; and mapping a plurality of virtual banks in the set of virtual banks to corresponding physical banks in the touch data acquisition process. Additionally or alternatively to one or more of the examples disclosed above, in some examples, synchronizing both the touch data acquisition process and the stylus data acquisition process to the display refresh process further includes re-mapping the virtual banks to physical banks in the touch data acquisition process if a phase drift between an acquisition of the set of virtual banks and the acquisition of the physical banks causes a prior mapping of the virtual banks to the physical banks to become inaccurate. Additionally or alternatively to one or more of the examples disclosed above, in some examples, synchronizing the touch data acquisition process to the display refresh process includes acquiring data from a first physical bank of the touch data acquisition process at substantially a same time as a first pulse generated by a display controller.

Some examples of the disclosure are directed to a non-transitory computer readable storage medium having stored thereon a set of instructions for synchronizing a touch data acquisition process, a stylus data acquisition process and a display refresh process, that when executed by a processor causes the processor to: synchronize the touch data acquisition process to the display refresh process; detect a presence of a stylus signal and initiating a stylus data acquisition process when the presence of a stylus signal is detected; synchronize the touch data acquisition process to the stylus data acquisition process; and synchronize both the touch data acquisition process and the stylus data acquisition process to the display refresh process. Additionally or alternatively to one or more of the examples disclosed above, in some examples, synchronizing the touch data acquisition process to the display refresh process includes beginning the touch data acquisition process at substantially the same time as a first pulse generated by a display controller. Additionally or alternatively to one or more of the examples disclosed above, in some examples, synchronizing the touch data acquisition process to the stylus data acquisition process includes determining if there is sufficient time to perform a scheduled touch scan before a next scheduled stylus scan, and if there is insufficient time, delaying the scheduled touch scan until the next scheduled stylus scan has concluded. Additionally or alternatively to one or more of the examples disclosed above, in some examples, the touch data acquisition process includes acquiring touch data from a plurality of physical banks of the touch sensor panel, and wherein the touch data acquisition process includes sequentially scanning multiple physical banks of the plurality of physical banks. Additionally or alternatively to one or more of the examples disclosed above, in some examples, synchronizing both the touch data acquisition process and the stylus data acquisition process to the display refresh process further comprises: creating a set of virtual banks, wherein a first virtual bank in the set of virtual banks corresponds to the touch data associated with a first physical bank of data scanned after a first stylus scan of the stylus data acquisition process; and mapping a plurality of virtual banks in the set of virtual banks to corresponding physical banks in the touch data acquisition process. Additionally or alternatively to one or more of the examples disclosed above, in some examples, synchronizing both the touch data acquisition process and the stylus data acquisition process to the display refresh process further includes re-mapping the virtual banks to physical banks in the touch data acquisition process if a phase drift between an acquisition of the set of virtual banks and the acquisition of the physical banks causes a prior mapping of the virtual banks to the physical banks to become inaccurate. Additionally or alternatively to one or more of the examples disclosed above, in some examples, synchronizing the touch data acquisition process to the display refresh process includes acquiring data from a first physical bank of the touch data acquisition process at substantially a same time as a first pulse generated by a display controller.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A method for synchronizing a touch data acquisition process, a stylus data acquisition process, and a display refresh process, the method comprising:
   synchronizing the touch data acquisition process to the display refresh process;
   detecting a presence of a stylus signal and initiating the stylus data acquisition process when the presence of a stylus signal is detected, wherein initiating the stylus data acquisition process interrupts the touch data acquisition process;
   synchronizing the touch data acquisition process to the stylus data acquisition process; and
   synchronizing reporting touch data from the touch data acquisition process and stylus data from the stylus data acquisition process with the display refresh process.

2. The method of claim 1, wherein synchronizing the touch data acquisition process to the display refresh process includes beginning the touch data acquisition process at substantially the same time as a first pulse generated by a display controller.

3. The method of claim 1, wherein synchronizing the touch data acquisition process to the stylus data acquisition process includes determining whether there is sufficient time to perform a scheduled touch data scan before a next scheduled stylus data scan, and when there is insufficient time, delaying the scheduled touch data scan until the next scheduled stylus data scan has concluded.

4. The method of claim 1, wherein the touch data acquisition process includes performing a plurality of first touch data scans, wherein each of the plurality of first touch data scans includes acquiring touch data from one or more of a plurality of physical banks of a touch sensor panel.

5. The method of claim 4, wherein synchronizing reporting touch data from the touch data acquisition process and stylus data from the stylus data acquisition process with the display refresh process further comprises:
   creating a set of virtual banks, wherein a first virtual bank in the set of virtual banks corresponds to the touch data associated with a first physical bank of data scanned after a first stylus data scan of the stylus data acquisition process; and
   mapping a plurality of virtual banks in the set of virtual banks to corresponding physical banks in the touch data acquisition process.

6. The method of claim 5, wherein synchronizing reporting touch data from the touch data acquisition process and stylus data from the stylus data acquisition process with the display refresh process further includes re-mapping the virtual banks to physical banks in the touch data acquisition process when a phase drift between an acquisition of the set of virtual banks and the acquisition of the physical banks causes a prior mapping of the virtual banks to the physical banks to become inaccurate.

7. The method of claim 5, wherein synchronizing the touch data acquisition process to the display refresh process includes acquiring touch data from a first physical bank of the touch data acquisition process at substantially a same time as a first pulse generated by a display controller.

8. An apparatus capable of synchronizing a touch data acquisition process, a stylus data acquisition process and a display refresh process, the apparatus comprising:
   a touch controller capable of sending signals to and receiving signals from a touch screen and performing the touch data acquisition process and the stylus data acquisition process;
   a display controller capable of refreshing an image displayed on the touch screen; and
   one or more processors capable of:
      synchronizing the touch data acquisition process to the display refresh process;
      detecting a presence of a stylus signal and initiating a stylus data acquisition process when the presence of a stylus signal is detected, wherein initiating the stylus data acquisition process interrupts the touch data acquisition process;
      synchronizing the touch data acquisition process to the stylus data acquisition process; and
      synchronizing reporting touch data from the touch data acquisition process and stylus data from the stylus data acquisition process with the display refresh process.

9. The apparatus of claim 8, wherein synchronizing the touch data acquisition process to the display refresh process includes beginning the touch data acquisition process at substantially the same time as a first pulse generated by a display controller.

10. The apparatus of claim 8, wherein synchronizing the touch data acquisition process to the stylus data acquisition process includes determining if there is sufficient time to perform a scheduled touch data scan before a next scheduled stylus data scan, and when there is insufficient time, delaying the scheduled touch data scan until the next scheduled stylus data scan has concluded.

11. The apparatus of claim 8, wherein the touch data acquisition process includes performing a plurality of first touch data scans, wherein each of the plurality of first touch data scans includes acquiring touch data from one or more of a plurality of physical banks of a touch sensor panel.

12. The apparatus of claim 11, wherein synchronizing reporting touch data from the touch data acquisition process and stylus data from the stylus data acquisition process with the display refresh process further comprises:
   creating a set of virtual banks, wherein a first virtual bank in the set of virtual banks corresponds to the touch data associated with a first physical bank of data scanned after a first stylus data scan of the stylus data acquisition process; and mapping a plurality of virtual banks in the set of virtual banks to corresponding physical banks in the touch data acquisition process.

13. The apparatus of claim 12, wherein synchronizing reporting touch data from the touch data acquisition process and stylus data from the stylus data acquisition process with the display refresh process further includes re-mapping the virtual banks to physical banks in the touch data acquisition process when a phase drift between an acquisition of the set of virtual banks and the acquisition of the physical banks causes a prior mapping of the virtual banks to the physical banks to become inaccurate.

14. The apparatus of claim 12, wherein synchronizing the touch data acquisition process to the display refresh process includes acquiring touch data from a first physical bank of the touch data acquisition process at substantially a same time as a first pulse generated by a display controller.

15. A non-transitory computer readable storage medium having stored thereon a set of instructions for synchronizing a touch data acquisition process, a stylus data acquisition process and a display refresh process, that when executed by a processor causes the processor to:

synchronize the touch data acquisition process to the display refresh process;

detect a presence of a stylus signal and initiate the stylus data acquisition process when the presence of a stylus signal is detected, wherein initiating a stylus data acquisition process interrupts the touch data acquisition process;

synchronize the touch data acquisition process to the stylus data acquisition process; and synchronize reporting touch data from the touch data acquisition process and stylus data from the stylus data acquisition process with the display refresh process.

16. The non-transitory computer readable storage medium of claim 15, wherein synchronizing the touch data acquisition process to the display refresh process includes beginning the touch data acquisition process at substantially the same time as a first pulse generated by a display controller.

17. The non-transitory computer readable storage medium of claim 15, wherein synchronizing the touch data acquisition process to the stylus data acquisition process includes determining whether there is sufficient time to perform a scheduled touch data scan before a next scheduled stylus data scan, and when there is insufficient time, delaying the scheduled touch data scan until the next scheduled stylus data scan has concluded.

18. The non-transitory computer readable storage medium of claim 15, wherein the touch data acquisition process includes performing a plurality of first touch data scans, wherein each of the plurality of first touch data scans includes acquiring touch data from one or more of a plurality of physical banks of a touch sensor panel.

19. The non-transitory computer readable storage medium of claim 18, wherein synchronizing reporting touch data from the touch data acquisition process and stylus data from the stylus data acquisition process with the display refresh process further causes one or more processors to:

create a set of virtual banks, wherein a first virtual bank in the set of virtual banks corresponds to the touch data associated with a first physical bank of data scanned after a first stylus data scan of the stylus data acquisition process; and map a plurality of virtual banks in the set of virtual banks to corresponding physical banks in the touch data acquisition process.

20. The non-transitory computer readable storage medium of claim 19, wherein synchronizing reporting touch data from the touch data acquisition process and stylus data from the stylus data acquisition process with the display refresh process further includes re-mapping the virtual banks to physical banks in the touch data acquisition process when a phase drift between an acquisition of the set of virtual banks and the acquisition of the physical banks causes a prior mapping of the virtual banks to the physical banks to become inaccurate.

21. The non-transitory computer readable storage medium of claim 19, wherein synchronizing the touch data acquisition process to the display refresh process includes acquiring touch data from a first physical bank of the touch data acquisition process at substantially a same time as a first pulse generated by a display controller.

22. The method of claim 1, wherein synchronizing the touch data acquisition process to the display refresh process further comprises:

interleaving a plurality of stylus detection scans with a plurality of first touch data scans, wherein the presence of the stylus signal is detected in at least one of the plurality of stylus detection scans.

23. The method of claim 22, wherein synchronizing the touch data acquisition process to the stylus data acquisition process further comprises:

interleaving a plurality of stylus data scans of the stylus data acquisition process with a plurality of second touch data scans of the touch data acquisition process.

24. The method of claim 23, wherein more banks of touch sensors are scanned during one of the plurality of second touch data scans than are scanned during one of the plurality of first touch data scans.

25. The method of claim 1, wherein the touch data acquisition process and reporting touch data are completed for each display refresh.

* * * * *